United States Patent [19]

Knox

[11] 3,905,020

[45] Sept. 9, 1975

[54] PROGRAMMABLE SOLID STATE SWITCH

[75] Inventor: Marion D. Knox, Oklahoma City, Okla.

[73] Assignee: Wayne Electronic Products Co., Oklahoma City, Okla.

[22] Filed: Feb. 4, 1974

[21] Appl. No.: 439,567

[52] U.S. Cl. .......... 340/147 P

[51] Int. Cl.$^2$ .......... H04Q 5/00

[58] Field of Search .......... 340/147 R, 147 P, 168 R, 340/172.5

[56] References Cited

UNITED STATES PATENTS

| | | | |
|---|---|---|---|
| 3,593,289 | 7/1971 | Wellheim et al. | 340/147 P |
| 3,622,990 | 11/1971 | Wellheim et al. | 340/147 P |
| 3,638,190 | 1/1972 | Knox | 340/147 P |
| 3,736,561 | 5/1973 | Rumpel | 340/147 P |
| 3,836,959 | 9/1974 | Pao et al. | 340/168 R |

*Primary Examiner*—Gareth D. Shaw
*Assistant Examiner*—Michael C. Sachs
*Attorney, Agent, or Firm*—Robert M. Hessin

[57] ABSTRACT

A solid state programmable switch apparatus for producing random and sequential output pulses for control applications. The apparatus consists of timing circuitry for providing either monostable or astable trigger output to sequentially drive a decimal counter device. Buffer circuitry provides high voltage decimal inputs to randomly drive the decimal counter and to enterface output pulses to each of a plurality of respective inputs to a programmable memory module. The memory module is programmable through pin plug interconnection to provide the desired output as desired to a plurality of respective output amplifier and control circuits.

11 Claims, 9 Drawing Figures

PROGRAMMABLE SOLID STATE SWITCH

BACKGROUND OF THE INVENTION

1. Field of the Invention

The invention relates generally to switching devices and, more particularly, but not by way of limitation, it relates to improved stepping apparatus for provision of timed pluralities of output pulses as generated in pre-settable programmed manner.

2. Description of the Prior Art

Applicant is not aware of any prior art more pertinent than U.S. Pat. No. 3,638,190 in the name of the present inventor and entitled "Adjustable Solid-State Program Control for Test Systems" as patented on Jan. 25, 1972. This prior art deals with an adjustable program matrix pre-set to provide specific control functions in relation to automatically controlled carrier testing systems for electrical transmission networks. The prior art teaching was directed to a specific application and required attendant circuitry peculiar to that application, and the subject matter of the present application is directed to more generalized applications of the essential principle of solid state programmable switches.

SUMMARY OF THE INVENTION

The present invention contemplates a pre-settable program switch for providing a plurality of control outputs in predetermined sequence and timing. In a more limited aspect, the invention consists of a basic timing circuit providing trigger input to a decimal counter which, in turn, provides sequential step output through an isolation buffer circuitry to a programmable matrix which is manually adjustable to provide a pre-set sequence of control outputs.

Therefore, it is an object of the present invention to provide a high reliability adjustable program switch which is adaptable for any of numerous control applications.

It is also an object of the invention to provide a programmable switch capable of producing fast and accurate timed outputs which is highly stable yet relatively economical in application.

It is yet another object of the invention to provide a plural output program switch which is readily manually re-programmable in accordance with the exigencies of the particular application.

Finally, it is an object of the present invention to provide a plural output electronic switch wherein any of a plurality of outputs may be generated in accordance with manual programming of a solid state memory matrix.

Other objects and advantages of the invention will be evident from the following detailed description when read in conjunction with the accompanying drawings which illustrate the invention.

DETAILED DESCRIPTION OF THE INVENTION

Figure 1:
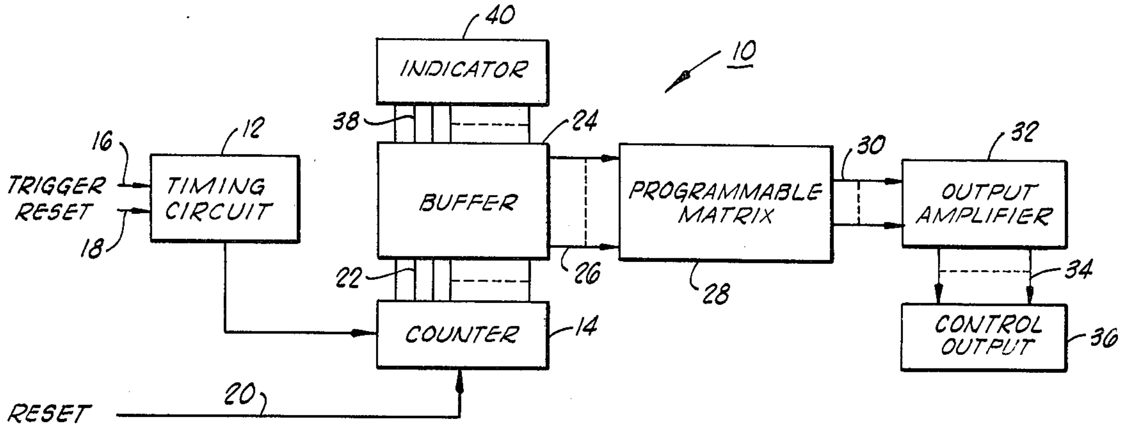
FIG. 1 is a block diagram of a program switch circuit as constructed in accordance with the present invention.

FIG. 1 illustrates the essential elements of program switch circuit 10 which includes a basic timing circuit 12 providing drive input to a counter circuit 14. The timing circuit 12 may be either free running as controlled by internal timing control devices, to be further described, or it can function with external trigger and reset from associated apparatus as is supplied via inputs 16 and 18, respectively. In the event that external trigger is utilized, reset via line 20 to counter 14 is also made available.

Selective count output pulses are available on leads 22 for input to buffer circuit 24 which, in turn, provides output via leads 26 to programmable matrix 28 which is manually pre-settable in selected manner to provide output on leads 30 to output amplifiers 32. A respective output amplifier 32 receives each of selected matrix outputs on leads 30, respectively, and amplified control output is available on selected ones of leads 34 to control output 36. Indicator stage 38, e.g. a Nixie tube stage or the like, provides visual indication of count sequencing as derived through buffer circuit 24.

Figures 2, 3:
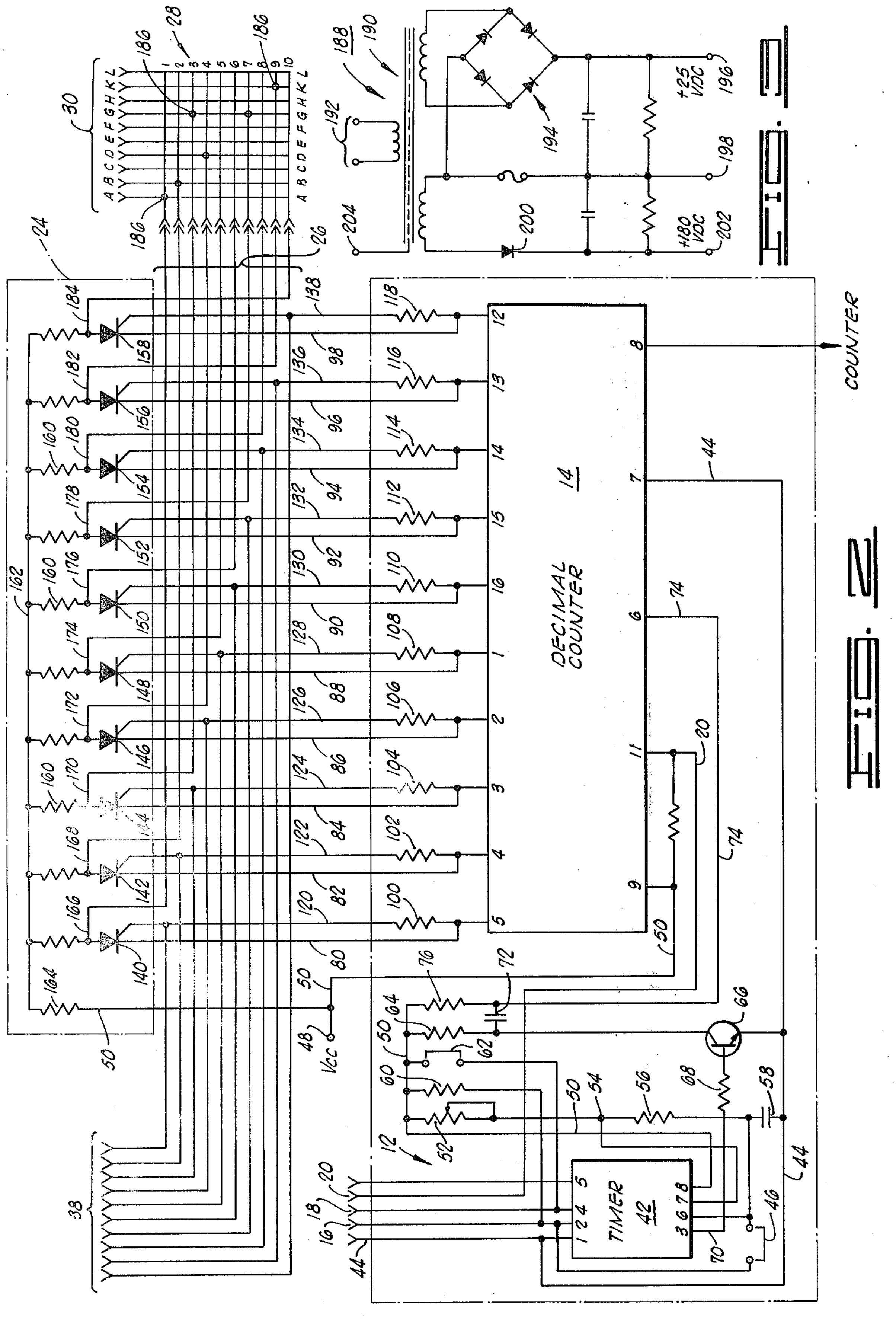
FIG. 2 is a schematic diagram, in partially blocked form, illustrating essential structure of the circuitry of FIG. 1.
FIG. 3 is a schematic diagram of a noise resistant power supply which may be utilized with the present invention.

Referring now to FIG. 2, the timing circuit 12 consists of an integrated circuit timer 42, a monolithic linear integrated circuit timer which may be, for example, a type NE555 as manufactured by Signetics Corporation. Negative or common input is applied via lead 44 as it is also supplied to decimal counter 14. External trigger may be applied via lead 16 with timing reset on lead 18, while counter reset is applied on lead 20. The lead 16 also includes a jumper connection 46 as reapplied at terminal number 6 of timer 42, thereby rendering the timer internally oscillatory for astable operation. With jumper 46 removed, timer 42 functions in a monostable mode in response to trigger input via lead 16 to terminal number 2 of timer 42. Plus voltage or $V_{cc}$ is applied at terminal 48 for conduction via lead 50 throughout the circuit. The $V_{cc}$ voltage on lead 50 is applied directly to terminal number 8 of timer 42 as well as through a variable timing resistance or potentiometer 52 to a junction point 54 and subsequent application to terminal number 7 of timer 42. Junction point 54 is then connected through an additional timing resistor 56 as connected in series with a timing capacitor 58 to common 44. The trigger input lead 16, as connected to terminal number 2 of timer 42, is biased through a resistor 60 connected to $V_{cc}$ lead 50, and a jumper 62 maintains $V_{cc}$ voltage on terminal number 4 of timer 42 during operation in the astable mode.

A resistor 64 serving as load resistor is connected in series with the collector of an NPN transistor 66 which is connected common-emitter. The base of transistor 66 is connected through a current limiting resistor 68 to receive trigger output via lead 70 from terminal number 3 of timer 42, and amplified output is available through collector-connected coupling capacitor 72 for input via lead 74 to terminal number 6 of decimal counter 14. The capacitor 72 and a resistor 76 also function to deferentiate the output from transistor 66 thereby to insure desirable wave shape.

When timer 42 functions in the astable mode, i.e. free running pulse output via lead 70, potentiometer 52 in concert with resistor 56 and capacitor 58 dictate the frequency of oscillation in accordance with the selected resistance/capacitance time constant. Thus, the timing capacitor 58 charges and discharges between one third $V_{cc}$ and two thirds $V_{cc}$ and the frequency of oscillation is given by $$F = \frac{1.46}{(R_{52} + 2R_{56})C_{58}}. \qquad (1)$$

When timer 42 is operated in the monostable state, the recovery time is controlled by the resistance/capacitance time constant of resistor 56 and capacitor 58. Thus, when once triggered, the timing circuit 42 cannot be retriggered until the lapse of an interval determined by $$T = 1.1\ R_{56}C_{58} \qquad (2)$$

The timing circuit 42 is re-started by connecting a negative pulse to stepper reset input lead 18.

The decimal counter 14 is a monlithic integrated circuit decimal counter of type number BIP 2610-1 as available from Burroughs Corporation. This particular type of counter utilizes 10 stages of dual SCS counter output stages which enable some desirable random output effects, as will be further discussed below. Decimal counter 14 is actuated by negative going pulses on lead 74 as input at terminal number 6.

Count output from decimal counter 14 is available as successive pulse outputs on respective output leads 80, 82, 84, 86, 88, 90, 92, 94, 96 and 98 (lead group 22 of FIG. 1) which are applied as cathode inputs to each of a plurality of silicone controlled rectifiers (SCR's) in buffer circuit 24, as will be further described. The outputs from decimal counter 14 are also applied through current monitoring resistors 100, 102, 104, 106, 108, 110, 112, 114, 116 and 118 for subsequent connection via leads 120, 122, 124, 126, 128, 130, 132, 134, 136 and 138 to the gate electrodes of the respective SCR's in buffer circuit 24. The trigger electrode leads 120 through 138 are also paralleled as lead group 38 for application to indicator circuit 40 (see FIG. 1).

The buffer circuit 24 is comprised of a plurality of SCR's 140, 142, 144, 146, 148, 150, 152, 154, 156 and 158 connected for parallel energization through a respective identical load resistor 160, each in series via a lead 162 with a common dropping resistor 163 as connected to the $V_{cc}$ lead 50. Thus, as successive or selected ones of SCR's 140 through 158 are energized, output voltage indication is available on a respective output lead 166, 168, 170, 172, 174, 176, 178, 180, 182 and 184 which constitute the output lead group 26 (FIG. 1) for input to the programmable matrix 28.

The programmable matrix 28 is a memory module consisting of a material cube having bussed X and Y contact strips wherein diode or shorting pins are utilizing to interconnect designated junctions in accordance with the desired program output. Present designs utilize a Pin matrix board designated as 10×10/3mm which is commercially available from Interswitch Company of Burlingame, California. This particular matrix board consists of 10 X busses as numbered 1 through 10 in FIG. 2, which are connected to receive respective inputs from buffer circuit 24, i.e. outputs 166 through 184 (lead group 26). There are then 10 Y coordinate or output leads as designated by letters A through L and connected to provide selected outputs via leads designated A through L, i.e. lead group 30 to output amplifiers 32 (FIG. 1). The selection of outputs in desired sequence is made by insertion of diode pins 36 which are insertable in the matrix cube to complete the circuit between selected X coordinate and Y coordinate conductors or busses. Conventional types of diode pins may be used in order to prevent any possibility of sneak circuits; however, in many applications simple shorting pins may be utilized as pins 186.

FIG. 3 illustrates a particular form of power supply 188 which is desirable for use in the present invention as it enables a high degree of noise isolation while also providing multiple output supply voltages. The power supply utilizes a highly effective isolation transformer 190 having especially low coupling capacitance in order to keep a-c transients out of the circuitry. Thus, line a-c as input at leads 192 is supplied through transformer 190 to a full wave rectifier 194 for derivation of 25 volts d-c at terminal 196 relative to common terminal 198. A-c voltage induced through a second winding of transformer 190 is supplied through a single rectifier 200 to provide an unregulated +180 volts d-c at terminal 202 for indicator utilization, as will be further described below. The core mechanism of transformer 190 is connected to the a-c input ground as shown at terminal 204. Transformer 190 may be such as the type M-8295 available from Microtran Co. of Valley Stream, N.Y.

Figures 4, 5, 6, 7:
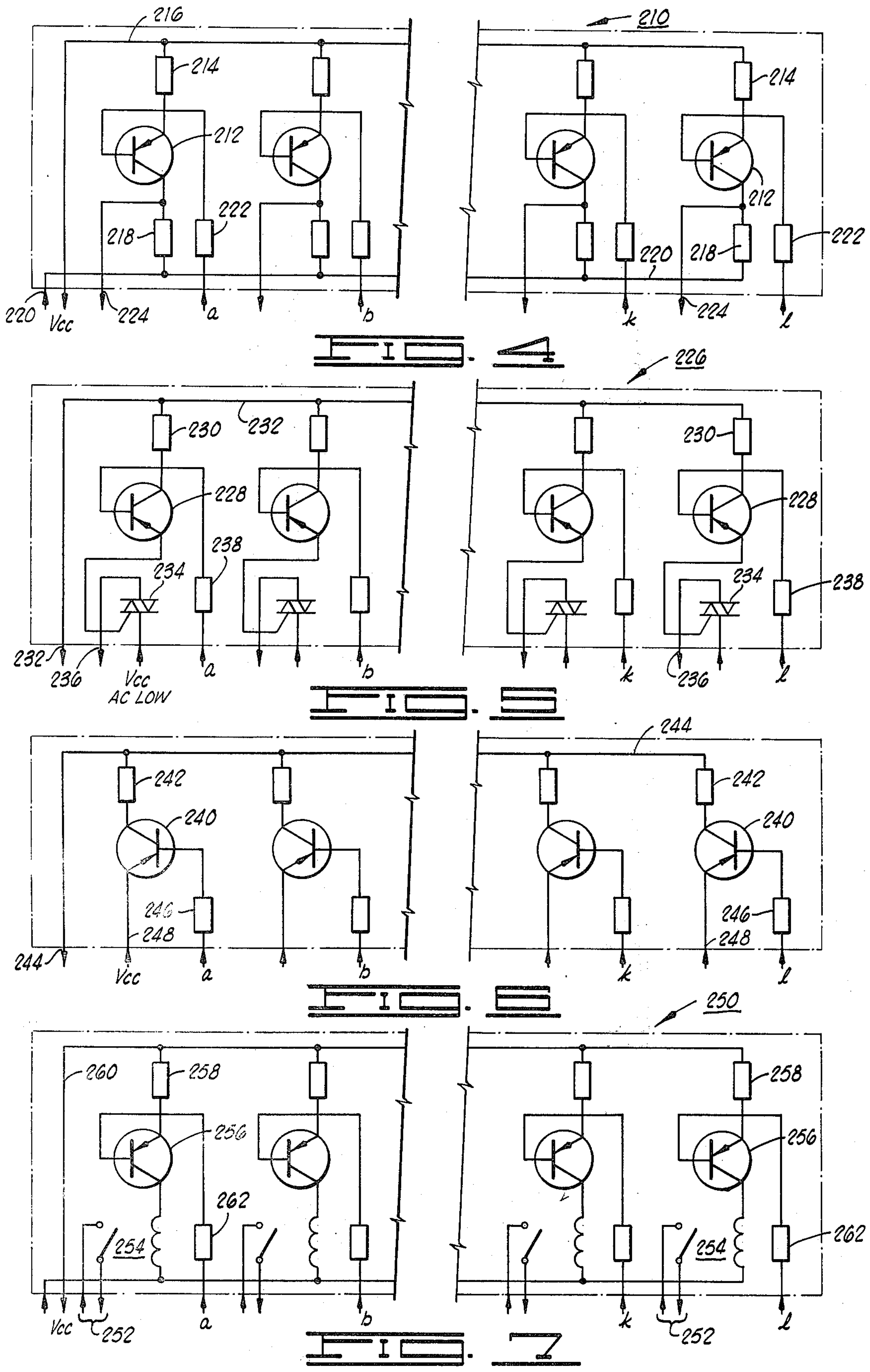
FIG. 4 is a schematic diagram of one form of output amplifier circuit as may be utilized with the present invention.
FIG. 5 is a schematic diagram of an alternative form of output amplifier circuit as may be utilized with the present invention.
FIG. 6 is a schematic diagram of yet another form of output amplifier circuit for utilization with the present invention.
FIG. 7 is a schematic diagram of still another form of output amplifier circuit to be utilized with the present invention.

The output amplifiers 32 (FIG. 1) may take any of various forms depending upon the current and the actuation requirement of the external circuitry to be controlled. Thus, FIG. 4 illustrates one form of output amplifier circuit 210 which is particularly desirable for utilization with TTL circuitry as it provides a positive logic output of 5 volts on and 0 volts off. Output amplifier 210 consists of a plurality of identical stages, one for each Y coordinate output of the programmable matrix 28. Each stage consists of a PNP transistor 212 connected through a load resistor 214 to the $V_{cc}$ voltage supply lead 216, and the collector is connected through a resistor 218 to common lead 220. The base of transistor 212 is energized by input through current limiting resistor 222 from the respective Y coordinate matrix output A through L. Energization of transistor 212 then provides logic output at a respective lead 224. Resistors are here shown as block designations in printed circuit board lay-out configuration.

FIG. 5 illustrates an output amplifier 226 which is particularly desirable for external circuitry having low current a-c requirements. Output amplifier 226 includes a plurality of identical thyristor actuation stages, each of which consists of a PNP transistor 228 with collector connected through a resistor 230 to common lead 232, and having the emitter connected directly to the gate of triac 234 which provides output via lead 236 when activated. The base of transistor 228 is connected through a limiting resistor 238 to the respective Y coordinate outputs A through L from programmable matrix 28 (FIG. 2).

FIG. 6 illustrates still another form of output which is desirable where the external circuitry is one having high alternating current requirements. In this instance, each stage consists of a PNP transistor 240 collector-connected through load resistor 242 to common lead 244. Supply voltage $V_{cc}$ is connected directly to the cathode of an external triac and the base is connected through a limiting resistor 246 to the respective Y coordinate control input from A through L outputs of programmable matrix 28. Output gating is taken off via respective emitter leads 248 to an external high current thyister board (not shown).

Yet another form of output amplifier 250 as shown in FIG. 7 provides control output in the form of relay actuation to provide actuation output via lead pair 252 as controlled by relay 254. A PNP transistor 256 is connected common-collector through the actuation coil of relay 254 with the emitter connected through a resistor 258 to the $V_{cc}$ supply lead 260, while the transistor base receives input from a respective Y coordinate output A through L through a current limiting resistor 262.

Various other output reaction devices may be utilized in accordance with the exigencies of the external equipment which may vary diversely for particular applications. The output amplifier 32 may include a plurality of diac elements in high current situations, or such output elements as opto-isolator, silicone control switches, solid state relays, and the like may also be employed to provide control output in accordance with the Y coordinate energizations which are enabled in the programmable matrix 28 (FIG. 1). In addition, while the illustration of FIG. 2 indicates a 10×10 matrix utilizing a 10 SCR stage buffer circuit 24 and a 10 unit output amplifier 32, it should be understood that it is within contemplation to include any of various sizes of matrix cube which would then dictate the number of isolation stages per buffer circuit 24 as well as the number of output reactors in output amplifier 32.

Figure 8:
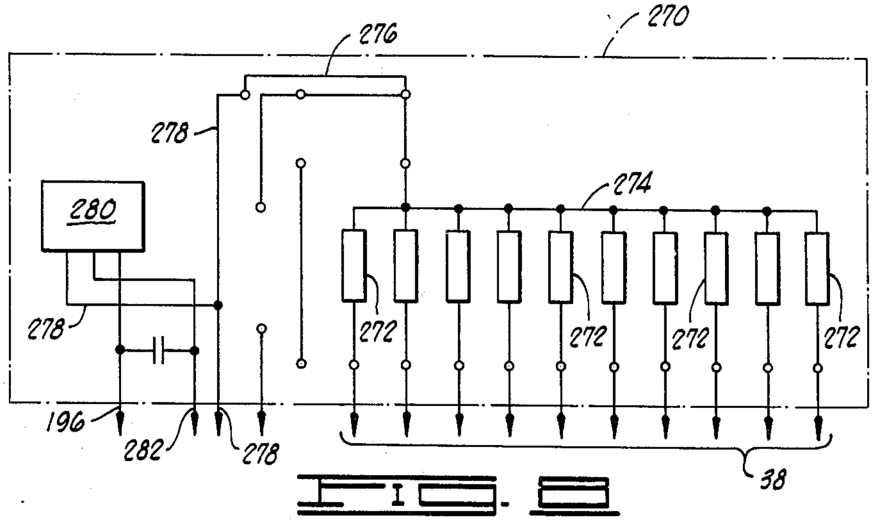
FIG. 8 is a schematic diagram of a power supply regulator circuit without a step indicator as utilized in the present invention.
Figure 9:
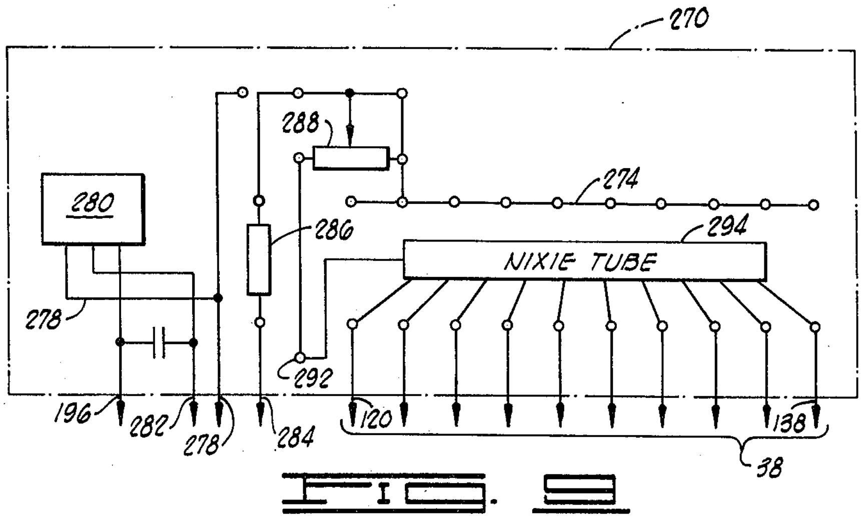
FIG. 9 is a schematic diagram of a power supply regulator with step indicator circuit for use in the present invention.

Referring again to FIGS. 1 and 2, the output lead group 38 may be utilized to provide visual indication of circuit operation. The circuitry of FIGS. 8 and 9 illustrate, in printed circuit lay-out form, the required interconnection both without and with employ of a Nixie tube indicator. FIG. 8 illustrates an indicator board 270, altered for circuit termination when visual indication is not desired. The output lead group 38 (FIG. 2) is applied to each of a plurality of identical value resistors 272 which are, in turn, connected in parallel to a lead 274 which is then connected by means of a jumper 276 to a regulated voltage supply lead 278 from a voltage regulator 280. The voltage regulator 280 supplies 15 volts d-c regulated voltage throughout the circuitry and is preferrably comprised of an integrated circuit of the type Micro A-7800 which is commercially available from Fairchild Semiconductors Inc. Unregulated 25 volts d-c from terminal 196 of power supply 188 (FIG. 3) is supplied to voltage regulator 280 which is also connected via lead 282 to the circuit common.

FIG. 9 discloses the indicator board 270 as altered to include visual indication capability. Thus, voltage regulator 280 functions in similar manner to provide output of plus 15 volts d-c regulated on lead 278 except that jumper connection 276 is removed to isolate voltage lead 274. The plus 180 volts d-c from terminal 202 of power supply 188 (FIG. 3) is applied at a lead 284 through an inserted resistor 286 and rheostat-connected trim pot 288 to a junction point 292 to provide anode voltage for a Nixie tube 294 of commercially available type. The remaining count inputs of Nixie tube 294 are connected to each of the respective leads 120 through 138 (see FIG. 2) of lead group 38. Visual indication will then be registered for each count of decimal counter 14 and, therefore, energization of the respective SCR circuits in buffer circuit 24 with output through the X coordinate lead group 26 to programmable matrix 28.

OPERATION

The program switch circuit 10, as shown largely in FIGS. 1 and 2, may be employed in any of diverse situations wherein it is desirable to control a plurality of differently timed energizations or switch actuations for control of external equipment. The timer 42 sets up a timing sequence which is controllable at any desired repetition rate up to 500 Kilohertz to control the decimal counter 14 through its repetitive sequence of count outputs as present on output leads 80 through 98 (FIG. 2). The count outputs, in turn, are further isolated and buffered through respective SCR stages 140 through 158 in buffer circuit 24 and are sequentially energized to provide outputs via leads 166 through 184 (lead group 26) to a programmable matrix 28.

The programmable matrix 28 is programmed in selected manner by placement of diode or shorting pins 186 to provide whatever the desired output sequence at the Y coordinates or output leads *a* through 1 (lead group 30 to output amplifier 32). As shown in FIG. 2 six shorting pins 186 are shown to be utilized such that stepped outputs would be available on output A and B followed by no output on lead C and another output provided on lead D. Output leads E and F provide no output while output lead G will have provided an output pulse on both the third and seventh counts of pulse indications input on leads 170 and 178, respectively. Finally, through the remainder of the count sequence output pulses will not be generated on leads H and L while output will be present on lead K on the ninth count of the output series. The decimal counter 14 will then recycle to count zero to actuate the same sequence of pulse outputs.

The pulse outputs themselves, present on selected ones of lead group 30, are applied to energize a selected form of output amplifier 32, e.g. circuitry as shown in FIGS. 4 through 7, thereby to provide programmed actuation of external control apparatus for carrying out any of numerous electronic control functions. The actual control functions which might utilize such a program switch circuit 10 are diverse and may include such as lighting control, hydraulic equipment control, machine tool control, automatic test systems, process control systems, telemetry and code systems, various forms of instrumentation and test equipment, and many other forms of functional systems which require precise timing and programming of multiple activations.

The decimal counter 14 can be reset to zero during any time in its cycle simply by grounding of lead 20 (terminal number 11) of counter 14. Lead 20 may be actuated by any suitable switching means which would provide connection to the system common momentarily, e.g. a front panel push button switch or the like.

It has also been discovered that the decimal counter 14, when connected in the manner illustrated in FIG. 2, and including the buffer circuitry 162 and Nixie indicator 294 (FIG. 9), can be made to operate randomly and in reverse, e.g. to count backwards.

Thus, taking for example the nine count from terminal number 12 of decimal counter 14 as operating through SCR 154 to provide output via lead 184 to programmable matrix 28, when energized the output voltage on lead 184 drops from approximately plus 15 volts d-c down to about plus 5 volts d-c for the count duration. This duration would initiate or enable activation along X coordinate line 10 of matrix 28. Further, during the "on" condition, there is approximately 1 to 2 volts d-c on the trigger electrode of SCR 184 and about 1 volt d-c at the output terminal of counter 14 as available on lead 98 to the cathode of SCR 184. When the nine count output turns off at terminal number 12 of decimal counter 14, conduction of SCR 158 ceases and the voltage on output lead 184 to matrix line 10 rises to plus 15 volts d-c while the voltage at terminal number 12 of decimal counter 14 rises to about plus 65 volts d-c due to the circuit interconnection with Nixie tube 294 and the high d-c voltage power available in indicator circuit board 270 (FIG. 19).

The counter can then be randomly actuated to provide selected count output by selectively grounding any one of the output terminals of decimal counter 14, i.e. a selected one of terminal numbers 5, 4, 3, 2, 1, 16, 15, 14, 13 or 12. The decimal counter 14 will reset the previous count and latch in the new count. The selected count will hold until a new count is selected or a negative pulse is counted from the timer. Thus, by providing some form of selected grounding contact to the outputs of decimal counter 14 the program switch circuit 10 becomes a programming switch having sequential and/or random override capability which gives the switch yet another dimension of applicability. The output terminals of decimal counter 14 may be interfaced with any of various ancillary equipment such as computers, limit switches, protective relays, etc. which are capable of interrupting the sequential output of the decimal counter 14 to drive the program matrix from any count to any other count.

Heretofore, the programmable matrix 28 has been referred to as a circuit board plug-in type of integral construction similar to that disclosed in the aforementioned U.S. Pat. No. 3,638,190. However, it should be understood that various forms of matrix array may be utilized in stage 28. For example, the programmable matrix 28 may consist of a simple diode array of preselected configuration or other form of permanent memory matrix utilized in association with program switch circuit 10.

The foregoing discloses a novel programmable electronic switch device which is capable of fast, positive actuation and which has both sequential and randomly selectable output capabilities. The device is particularly advantageous in that it can be constructed economically to provide rugged and compact circuit structure which is capable of extremely accurate and widely variable frequency of sequence actuation.

Changes may be made in the combination and arrangement of elements as heretofore set forth in the specification and shown in the drawings; it being understood that changes may be made in the embodiments disclosed without departing from the spirit and scope of the invention as defined in the following claims.

What is claimed is:

1. A timing circuit for selectively providing one or more output control pulses in predetermined time relationship, comprising:

timing means for generating a series of sequentially output trigger pulses;

decimal counter means actuated by input of said trigger pulses to provide a pulse output sequentially at each of the plural stages;

buffer means including plural reactance means each connected to be energized by selected one of said counter means plural pulse outputs, and each generating a corresponding output pulse only while being energized;

programmable means having plural inputs each connected to receive a respective output pulse from each said buffer means, and having plural outputs each capable of being conductively coupled to selected ones of said programmable matrix means plural inputs; and one or more output control means controlled by selected ones of said programmable matrix means plural outputs.

2. A timing circuit as set forth in claim 1 wherein said timing means comprises:

a monostable pulse generation circuit which generates to trigger pulse upon active initiation.

3. A timing circuit as set forth in claim 1 wherein said timing means comprises:

an astable pulse generation circuit which generates sequential trigger pulses at a predetermined pulse rate.

4. A timing circuit as set forth in claim 1 wherein said programmable matrix means comprises:

a plurality of X-coordinate inputs connected to receive respective signals output from said buffer means and plural Y-coordinate output connected to the respective one or more output means, and at least one shorting pin connector disposed to conductively connect one or more of said X-coordinate inputs to Y-coordinate outputs.

5. A timing circuit as set forth in claim 1 wherein said buffer means comprises:

plural silicon controlled rectifiers having anode, cathode and gate electrode, and having respective gate electrodes triggered by selected ones of said sequential pulses output from said decimal counter means, and having respective anodes connected to conduct one of said output pulses upon being energized; and current source means connected in parallel to power each of said anodes.

6. A timing circuit as set forth in claim 1 which is further characterized to include:

indicator means also receiving input of the pulse output from said decimal counter means to provide visual indication of count output.

7. A timing circuit as set forth in claim 5 which is further characterized to include:

means for grounding a randomly selected one of the silicon controlled rectifier cathodes to effect selective generation of that particular output pulse.

8. A timing circuit as set forth in claim 7 which is further characterized in that:

said controlled rectifier cathodes have a potential on the order of 65 volts when in the non-conductive state, and momentary grounding of selected cathodes act as a high voltage input to reset and latch said decimal counter means at the particular selected count output such that said counter functions as an up-down random counter.

9. A timing circuit for generating plural control pulses in predetermined time relationship, comprising:

timing means for generating a series of trigger pulses;

decimal counter means actuated by input of each of said series of trigger pulses to generate an output successively at each of plural counter outputs; and buffer means including plural silicon controlled rectifiers having anode, cathode and trigger electrode, and each respective trigger electrode being connected to a respective one of said decimal counter means successive outputs thereby to be triggered conductive and generate a corresponding control pulse output at the respective anode.

10. A timing circuit as set forth in claim 9 which further includes:

means for grounding a randomly selected one of the silicon controlled rectifier cathodes to effect selective generation of that particular control pulse output.

11. A timing circuit as set forth in claim 10 which is further characterized in that:

said controlled rectifier cathodes have a potential of approximately 65 volts when in the non-conductive state, and momentary grounding of a selected cathode functions as a high voltage input to reset and latch said decimal counter means at the particular selected counter output.

* * * * *